J. B. OLNEY.
Gas Generating and Carbureting Apparatus.
No. 85,239. Patented Dec. 22, 1868.
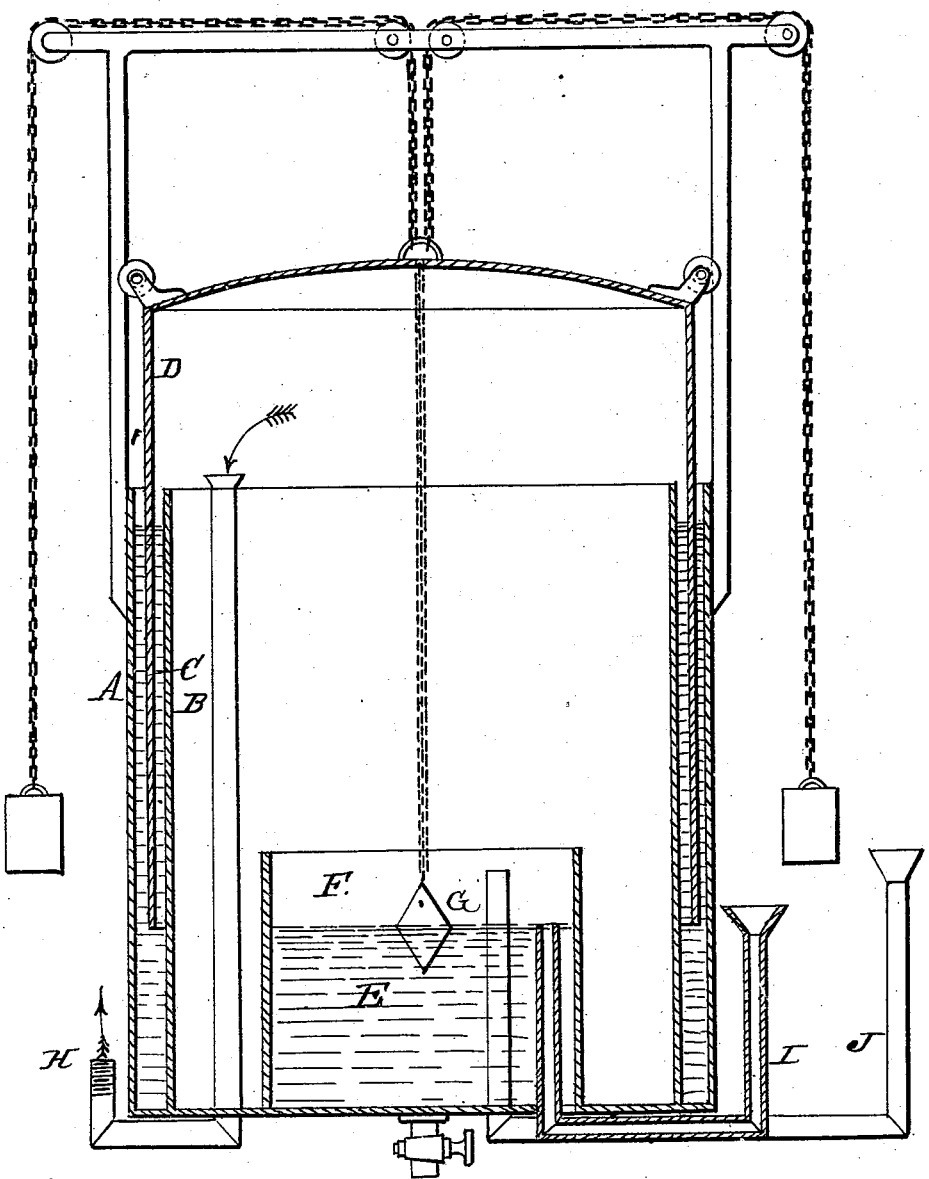

UNITED STATES PATENT OFFICE.

JAMES B. OLNEY, OF NEW YORK, N. Y.

IMPROVED GAS GENERATING AND CARBURETING APPARATUS.

Specification forming part of Letters Patent No. 85,239, dated December 22, 1868.

*To all whom it may concern:*

Be it known that I, JAMES B. OLNEY, of New York, in the county of New York and State of New York, have invented a new and valuable Improvement in Gas Generating and Carbureting Apparatus; and I do hereby declare that the following is a full, clear, and exact description of the construction and operation of the same, reference being had to the annexed drawings, making a part of this specification, and to the letters and figures of reference marked thereon.

The drawing is a representation of a vertical section of my apparatus.

The nature of my invention consists in constructing a machine in which hydrogen gas may be generated or set free from water by bringing water in contact with acids and zinc, or other decomposing substances, and afterward passing such hydrogen gas through hydrocarbonic oils, carbureting the same therein and storing the same in a gasometer for use. All this is accomplished by my device in such manner that the operation thereof is, to a great extent, automatic. This is done by inclosing the gas generating and carbureting apparatus inside a gas-holder, and constructing and arranging the different parts thereof in a novel and cheap form.

The letter A of the drawings is a representation of the outside shell or casing of the gasometer-tank. The letter B is the inside shell, and the letter C is the annular water-chamber between the two, in which the gasometer plays. The letter D is the gasometer, constructed in the ordinary form, and suspended by weights, as shown. The letter E is a tank within the annular water-chamber, in which I place water and acid or acids, as shown by the red color in the drawing. Within this tank, and above the water and acids aforesaid, and resting on the surface thereof, is a suitable body of hydrocarbon liquid, the amount of which is regulated by the richness of the same in carbon and by the extent to which I desire to carburet the gas. The point of space to be occupied by said hydrocarbonic liquid is shown at F on the drawing.

The letter G represents a piece of zinc or other metal or substance, or combination of metals or substances, possessing the qualities essential to the liberation of hydrogen gas from water when operating chemically with suitable acids. This zinc or substance is usually suspended, as shown, from the roof of the gasometer, and is submerged more or less in the acids and water, thus forming a battery for the decomposition of the water and the liberation of the hydrogen gas. The hydrogen thus liberated ascends and passes up through the hydrocarbon liquid at F, and becomes thereby loaded with a sufficient amount of carbon to form a good illuminating carbureted-hydrogen gas. The gas thus carbureted ascends into the gasometer and fills it in the usual manner, and raising it gradually by the pressure upward.

It will readily be seen that the zinc or substance suspended from the roof of the gasometer must be raised therewith, and that, when the gasometer is filled, the zinc will be above the water and acid, causing the manufacture of gas to cease, and also that, as the gas is drawn from the gasometer, the zinc will gradually sink to the liquid, and the process of manufacture will necessarily recommence. This device serves to adapt the supply to the demand, and makes the machine or apparatus automatic in its action.

I do not wish to confine myself to this specific method of bringing the zinc or other like substance in contact with the water and acids, but I deem it preferable to all other modes yet discovered.

The letter H represents the pipe through which the gas is discharged to the burners. Letter I is a tube through which the water and acids are introduced to the tank E, and letter J is a tube for introducing the hydrocarbon liquid.

The letter K is a pipe, with a suitable faucet for drawing off the contents of tank E whenever it is desirable so to do.

What I claim as my invention, and desire to secure by Letters Patent, is—

1. Carbureting hydrogen gas by the process and in the manner herein specified.

2. A gas generating and carbureting apparatus, having shells A and B, gasometer D, tank E, pipes H, I, J, and K, combined with the zinc or substance F, constructed and arranged substantially as herein described.

In testimony that I claim the above I have hereunto subscribed my name in the presence of two witnesses.

JAMES B. OLNEY.

Witnesses:
C. D. GILMORE,
H. A. SNOW.